(12) United States Patent
Gubbi et al.

(10) Patent No.: US 7,324,544 B1
(45) Date of Patent: *Jan. 29, 2008

(54) NETWORK SLOT SYNCHRONIZATION SCHEME FOR A COMPUTER NETWORK COMMUNICATION CHANNEL

(75) Inventors: Rajugopal Gubbi, Fair Oaks, CA (US); Donia Sevastian, Folsom, CA (US); Natarajan Ekambaram, Rancho Cordova, CA (US); Nirmalendu Bikash Patra, Cameron Park, CA (US)

(73) Assignee: Cirrus Logic, Inc., Austin, TX (US)

( * ) Notice: Subject to any disclaimer, the term of this patent is extended or adjusted under 35 U.S.C. 154(b) by 716 days.

This patent is subject to a terminal disclaimer.

(21) Appl. No.: 10/368,652

(22) Filed: Feb. 18, 2003

Related U.S. Application Data (63) Continuation-in-part of application No. 09/151,579, filed on Sep. 11, 1998, now abandoned.

(51) Int. Cl.
  *H04J 3/16* (2006.01)
(52) U.S. Cl. .................. 370/442; 370/459; 370/462; 455/450; 709/229; 709/224; 709/225
(58) Field of Classification Search ................ 709/218, 709/220, 225–227, 232, 224, 229; 370/278, 370/339, 330, 341, 431, 455, 509, 510, 442, 370/462; 455/450
  See application file for complete search history.

(56) References Cited

U.S. PATENT DOCUMENTS

| 4,700,019 | A | 10/1987 | Kerschner et al. |
| 4,887,266 | A | 12/1989 | Neve et al. |
| 4,893,306 | A | 1/1990 | Chao et al. |
| 4,905,234 | A | 2/1990 | Childress et al. |
| 5,001,472 | A | 3/1991 | Fischer et al. |
| 5,117,423 | A | 5/1992 | Shepherd et al. |

(Continued)

FOREIGN PATENT DOCUMENTS

EP 288 904 A2 4/1988

(Continued)

*Primary Examiner*—Nathan Flynn
*Assistant Examiner*—Mohammad Siddiqi
(74) *Attorney, Agent, or Firm*—James J. Murphy; Thompson & Knight LLP (57) ABSTRACT

Synchronization within a common communication channel having designated transmission time slots for various devices of a computer network is maintained by allowing transmissions within the channel outside of a network device's designated time slot when a clear channel assessment indicates that a previous time slot is not being utilized by its associated device and/or upon receipt of an indication of the end of a transmission of another device in the network. The clear channel assessment preferably takes into account the device's designated transmission time slot within the communication channel with respect to those of other network devices and may be a time period that is the product of a predetermined clear channel waiting time and a numerical representation of the device's designated transmission time slot within the communication channel with respect to those of other network devices. The clear channel waiting time itself may be specified by a network master device as part of a network connection process. The network device may be configured to construct one or more packets for transmission within the network in advance of its designated time slot to accommodate these early transmissions.

11 Claims, 8 Drawing Sheets

U.S. PATENT DOCUMENTS

| | | |
|---|---|---|
| 5,140,586 A | 8/1992 | Kloper et al. |
| 5,150,362 A | 9/1992 | Akerberg |
| 5,280,498 A | 1/1994 | Tymes et al. |
| 5,295,140 A | 3/1994 | Crisler et al. |
| 5,297,144 A | 3/1994 | Gilbert et al. |
| 5,355,374 A | 10/1994 | Hester et al. |
| 5,408,506 A | 4/1995 | Mincher et al. |
| 5,481,541 A | 1/1996 | Gareh et al. |
| 5,493,569 A | 2/1996 | Buchholz et al. |
| 5,502,722 A | 3/1996 | Fulghum |
| 5,509,049 A | 4/1996 | Peterson |
| 5,515,366 A | 5/1996 | Chieu et al. |
| 5,550,848 A | 8/1996 | Doshi et al. |
| 5,572,546 A | 11/1996 | Serfaty et al. |
| 5,682,604 A | 10/1997 | Kashi et al. |
| 5,699,532 A | 12/1997 | Barret et al. |
| 5,721,693 A | 2/1998 | Song |
| 5,721,733 A | 2/1998 | Wang et al. |
| 5,729,541 A | 3/1998 | Hamalainen et al. |
| 5,734,646 A | 3/1998 | I et al. |
| 5,740,542 A | 4/1998 | Leeper et al. |
| 5,761,083 A | 6/1998 | Brown, Jr. et al. |
| 5,796,728 A | 8/1998 | Rondeau et al. |
| 5,799,010 A * | 8/1998 | Lomp et al. ............... 370/335 |
| 5,812,547 A | 9/1998 | Benzimru et al. |
| 5,878,277 A | 3/1999 | Ohta |
| 5,889,771 A | 3/1999 | Alvator |
| 5,898,831 A | 4/1999 | Hall et al. |
| 5,901,067 A | 5/1999 | Kao et al. |
| 5,905,442 A | 5/1999 | Mosebrook et al. |
| 5,907,544 A | 5/1999 | Rypinski |
| 5,909,183 A | 6/1999 | Borgstahl et al. |
| 5,922,047 A | 7/1999 | Newlin et al. |
| 5,956,487 A | 9/1999 | Venkatraman et al. |
| 5,966,376 A | 10/1999 | Rakib et al. |
| 5,987,590 A | 11/1999 | Wing So |
| 6,003,070 A | 12/1999 | Frantz |
| 6,016,311 A | 1/2000 | Gilbert et al. |
| 6,016,322 A | 1/2000 | Goldman |
| 6,021,324 A | 2/2000 | Sizer, II et al. |
| 6,052,594 A | 4/2000 | Chuang et al. |
| 6,219,838 B1 | 4/2001 | Cherichetti et al. |
| 6,891,847 B1 * | 5/2005 | Gubbi ........................ 370/442 |

FOREIGN PATENT DOCUMENTS

| | | |
|---|---|---|
| EP | 475 682 B1 | 9/1991 |
| EP | 670 640 A2 | 2/1995 |
| EP | 752 764 A2 | 6/1996 |
| EP | 750 284 A2 | 12/1996 |
| EP | 896 492 | 6/1997 |
| EP | 75 0 284 | 12/1997 |
| EP | 861 008 | 8/1998 |
| GB | 2 320 162 | 6/1998 |
| WO | WO 98/01002 | 1/1990 |
| WO | WO 95/35002 | 12/1995 |
| WO | WO 98/00993 | 1/1998 |
| WO | WO 98/24250 | 6/1998 |
| WO | WO 98/27667 | 6/1998 |
| WO | WO 98/27747 | 6/1998 |
| WO | WO 98/33347 | 7/1998 |
| WO | WO 98/49851 | 11/1998 |
| WO | PCT/US99/20478 | 9/1999 |
| WO | PCT/US00/19904 | 11/2000 |

* cited by examiner

NETWORK SLOT SYNCHRONIZATION SCHEME FOR A COMPUTER NETWORK COMMUNICATION CHANNEL

RELATED APPLICATION

This application is a continuation-in-part of application Ser. No. 09/151,579, has now been abandoned, entitled "Method and Apparatus for Accessing a Computer Network Communication Channel", filed Sep. 11, 1998, by Rajugopal R. Gubbi, Natarajan Ekambaram and Nirmalendu Bikash Patra, and assigned to the Assignee of the present application.

FIELD OF THE INVENTION

The present invention relates generally to a scheme for communications within a computer network and, in particular, to synchronizing such communications as occur between a central server and a number of client units across a wireless communications link.

BACKGROUND

Modern computer networks allow for inter-communication between a number of nodes such as personal computers, workstations, peripheral units and the like. Network links transport information between these nodes, which may sometimes be separated by large distances. However, to date most computer networks have relied on wired links to transport this information. Where wireless links are used, they have typically been components of a very large network, such as a wide area network, which may employ satellite communication links to interconnect network nodes separated by very large distances. In such cases, the transmission protocols used across the wireless links have generally been established by the service entities carrying the data being transmitted, for example, telephone companies and other service providers.

In the home environment, computers have traditionally been used as stand-alone devices. More recently, however, there have been some steps taken to integrate the home computer with other appliances. For example, in so-called "Smart Homes", computers may be used to turn on and off various appliances and to control their operational settings. In such systems, wired communication links are used to interconnect the computer to the appliances that it will control. Such wired links are expensive to install, especially where they are added after the original construction of the home.

In an effort to reduce the difficulties and costs associated with wired communication links, some systems for interconnecting computers with appliances have utilized analog wireless links for transporting information between these units. Such analog wireless links operate at frequencies commonly utilized by wireless telephones. Although easier to install than conventional wired communication links, analog wireless communication links suffer from a number of disadvantages. For example, degraded signals may be expected on such links because of multipath interference. Furthermore, interference from existing appliances, such as televisions, cellular telephones, wireless telephones and the like may be experienced. Thus, analog wireless communication links offer less than optimum performance for a home environment.

In the above-referenced co-pending application Ser. No. 09/151,579, which is incorporated herein by reference, a computer network employing a digital, wireless communication link adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used.

Figure 1:
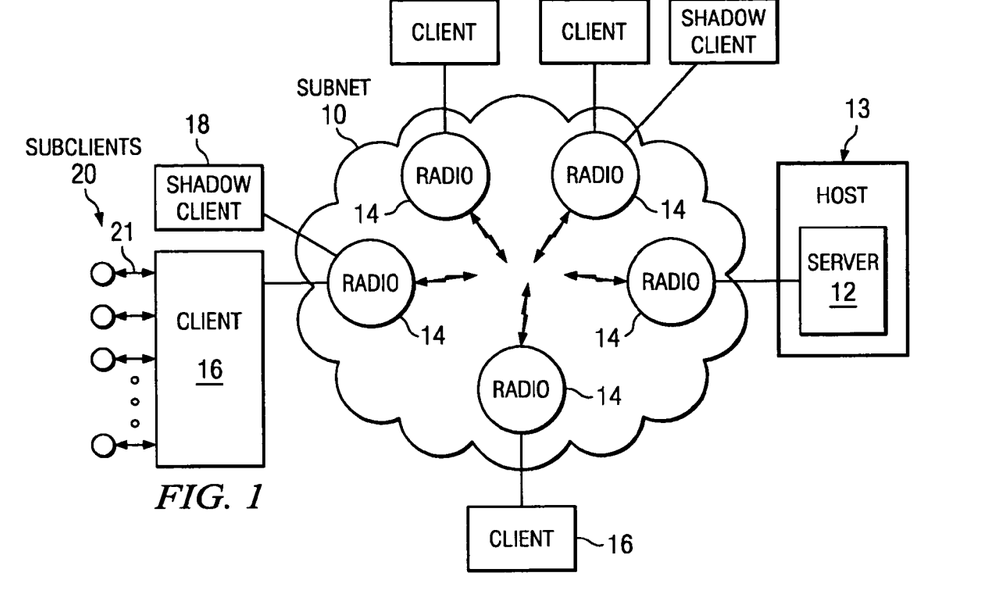
FIG. 1 illustrates a generalized network structure that is supported by a wireless protocol that is one embodiment of the present invention.

The generalization of this network structure is shown in FIG. 1. A subnet 10 includes a server 12. In this scheme, the term "subnet" is used to describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, personal computers, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14, which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 21, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infrared links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

Figure 2:
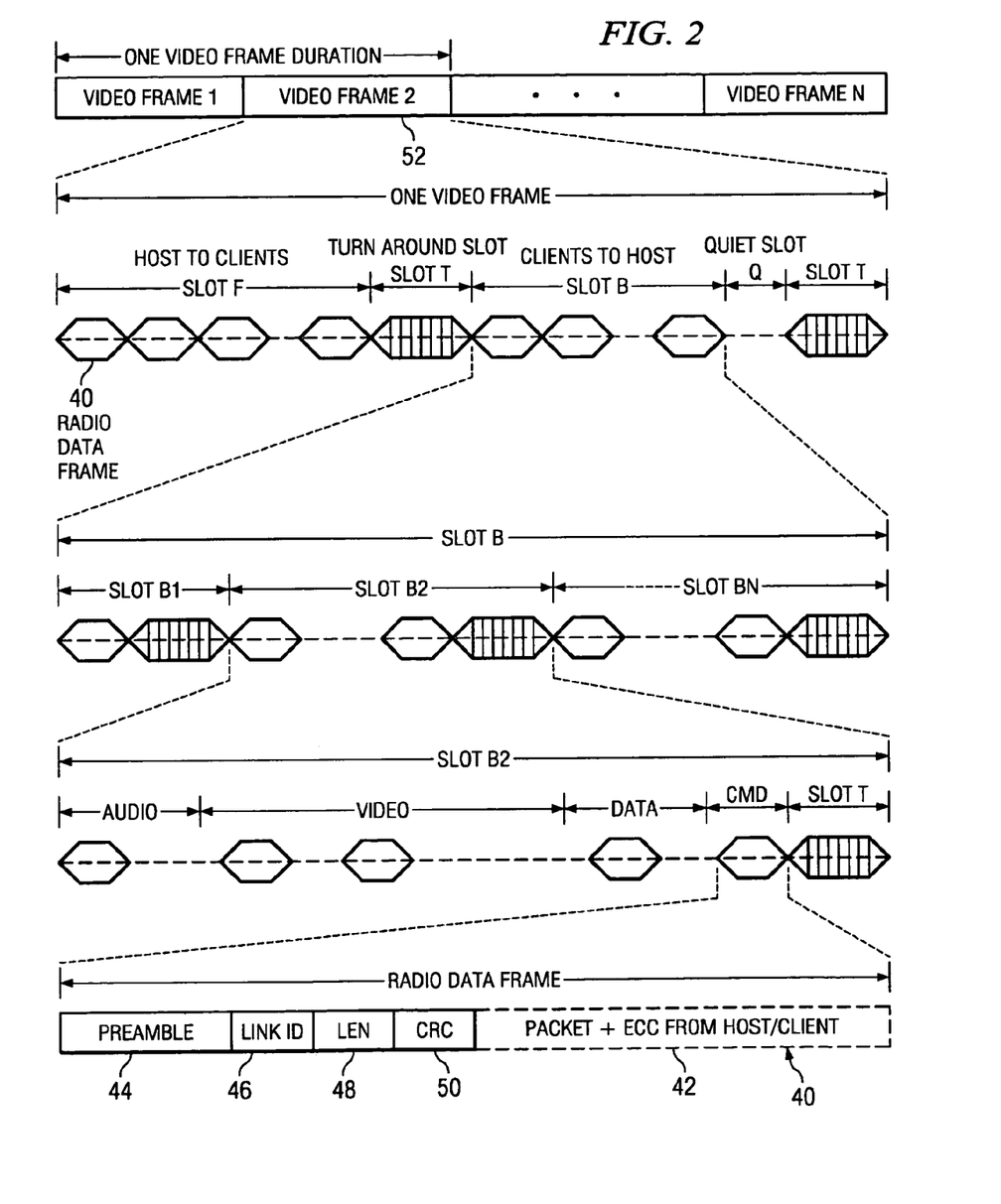
FIG. 2 illustrates a hierarchical arrangement for the transmission of data within a subnet according to one embodiment of the present invention.

The slotted link structure of the wireless communication protocol for the transmission of real time, multimedia data (e.g., as frames) within a subnet 10 is shown in FIG. 2. At the highest level within a channel, forward (F) and backward or reverse (B) slots of fixed (but negotiable) time duration are provided within each frame transmission period. During forward time slots F, server 12 may transmit video and/or audio data and/or commands to clients 16, which are placed in a listening mode. During reverse time slots B, server 12 listens to transmissions from the clients 16. Such transmissions may include audio, video or other data and/or commands from a client 16 or an associated subclient 20. At the second level of the hierarchy, each transmission slot (forward or reverse) is made up of one or more radio data frames 40 of variable length. Finally, at the lowest level of the hierarchy, each radio data frame 40 is comprised of server/client data packets 42, which may be of variable length.

Each radio data frame 40 is made up of one server/client data packet 42 and its associated error correction coding (ECC) bits. The ECC bits may be used to simplify the detection of the beginning and ending of data packets at the receive side. Variable length framing is preferred over constant length framing in order to allow smaller frame lengths during severe channel conditions and vice-versa. This adds to channel robustness and bandwidth savings. Although variable length frames may be used, however, the ECC block lengths are preferably fixed. Hence, whenever the data packet length is less than the ECC block length, the ECC block may be truncated (e.g., using conventional virtual zero techniques). Similar procedures may be adopted for the last block of ECC bits when the data packet is larger.

As shown in the illustration, each radio data frame 40 includes a preamble 44, which is used to synchronize pseudo-random (PN) generators of the transmitter and the receiver. Link ID 46 is a field of fixed length (e.g., 16 bits long for one embodiment), and is unique to the link, thus identifying a particular subnet 10. Data from the server 12/client 16 is of variable length as indicated by a length field 48. Cyclic redundancy check (CRC) bits 50 may be used for error detection/correction in the conventional fashion.

For the illustrated embodiment then, each frame 52 is divided into a forward slot F, a backward slot B, a quiet slot Q and a number of radio turn around slots T. Slot F is meant for server 12-to-clients 16 communication. Slot B is time shared among a number of mini-slots $B_1$, $B_2$, etc., which are assigned by server 12 to the individual clients 16 for their respective transmissions to the server 12. Each mini-slot $B_1$, $B_2$, etc. includes a time for transmitting audio, video, voice, lossy data (i.e., data that may be encoded/decoded using lossy techniques or that can tolerate the loss of some packets during transmission/reception), lossless data (i.e., data that is encoded/decoded using lossless techniques or that cannot tolerate the loss of any packets during transmission/reception), low bandwidth data and/or command (Cmd.) packets. Slot Q is left quiet so that a new client may insert a request packet when the new client seeks to log-in to the subnet 10. Slots T appear between any change from transmit to receive and vice-versa, and are meant to accommodate individual radios' turn around time (i.e., the time when a half-duplex radio 14 switches from transmit to receive operation or vice-versa). The time duration of each of these slots and mini-slots may be dynamically altered through renegotiations between the server 12 and the clients 16 so as to achieve the best possible bandwidth utilization for the channel. Note that where full duplex radios are employed, each directional slot (i.e., F and B) may be full-time in one direction, with no radio turn around slots required.

Forward and backward bandwidth allocation depends on the data handled by the clients 16. If a client 16 is a video consumer, for example a television, then a large forward bandwidth is allocated for that client. Similarly if a client 16 is a video generator, for example a video camcorder, then a large reverse bandwidth is allocated to that particular client. The server 12 maintains a dynamic table (e.g., in memory at server 12 or host 13), which includes forward and backward bandwidth requirements of all on-line clients 16. This information may be used when determining whether a new connection may be granted to a new client. For example, if a new client 16 requires more than the available bandwidth in either direction, server 12 may reject the connection request. The bandwidth requirement (or allocation) information may also be used in deciding how many radio packets a particular client 16 needs to wait before starting to transmit its packets to the server 12. Additionally, whenever the channel conditions change, it is possible to increase/reduce the number of ECC bits to cope with the new channel conditions. Hence, depending on whether the information rate at the source is altered, it may require a dynamic change to the forward and backward bandwidth allocation.

Given the slotted link structure of the communication channel, a network slot synchronization scheme is needed, to ensure that network master devices (e.g., server 12) and other network device (e.g., clients 16) can properly communicate with one another.

SUMMARY OF THE INVENTION

In one embodiment, synchronization within a common communication channel having designated transmission time slots for various devices of a computer network is maintained by allowing transmissions within the channel outside of a network device's designated time slot only if a clear channel assessment indicates that a previous time slot is not being utilized by its associated device. The clear channel assessment preferably takes into account the device's designated transmission time slot within the communication channel with respect to those of other network devices. In some cases, the clear channel assessment is a time period that is the product of a predetermined clear channel waiting time and a numerical representation of the device's designated transmission time slot within the communication channel with respect to those of other network devices. The clear channel waiting time itself may be specified by a network master device as part of a network connection process.

The network device may be configured to construct one or more packets for transmission within the network in advance of its designated time slot. For example, the device may include an early transmission timer configured to trigger the construction of such packets in advance of the designated time slot. This allows for the early transmissions without undue delay.

In a further embodiment, a transmission time timer within a first device configured to operate within a computer network having a common communication channel, wherein each device within the network is designated a specific transmission time slot, is maintained so as to ensure that the first device transmits within it's associated designated transmission time slot. However, the first device may be permitted to transmit over the common communication channel upon receipt of an indication of the end of a transmission of a second device within the computer network having a designated transmission time slot that precedes that of the first device, regardless of whether or not that transmission will occur at a time specified by the transmission time timer. For example, receipt of a command or passed token. Here too, the first device may construct one or more packets for transmission within the network in advance of its designated transmission time so as to be ready to accommodate such token passes. In general though, the first device transmits over the common communication channel only if the channel is not being utilized by another network device and this may be true regardless of whether or not the transmission time timer indicates that the designated time slot of the first device has arrived.

The first device may also maintain a clear channel assessment indicator that takes into account the first device's designated transmission time slot within the communication channel with respect to those of other network devices. Thus, the first device may transmit within the common communication channel upon an indication from the clear channel assessment indicator that the channel is available for transmission, regardless of whether or not the transmission time timer indicates that the first device's designated transmission time has arrived. Usually, the clear channel assessment indication is made upon the expiration of a time period that is the product of a predetermined clear channel waiting time and a numerical representation of the first device's designated transmission time slot within the communication channel with respect to those of other network devices. The clear channel waiting time may be designated by a network master device upon a connection thereto by the first device. The clear channel assessment transmission scheme may be used in conjunction with scheme that provides for the indication of the end of a transmission through a command or token pass, etc., to allow for transmissions without undue delay.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which.

DETAILED DESCRIPTION

Described herein is a network slot synchronization scheme for use between a network master device (e.g., a server) and associated network clients within a communication channel of a computer network. The present scheme is generally applicable to a variety of network environments, but finds especially useful application in a wireless computer network which is located in a home environment. Thus, the present scheme will be discussed with reference to the particular aspects of a home environment. However, this discussion should in no way be seen to limit the applicability or use of the present invention in and to other network environments and the broader spirit and scope of the present invention is recited in the claims which follow this discussion.

One important term used throughout the following discussion is "channel". As indicated above, a channel is defined as the combination of a transmission frequency (more properly a transmission frequency band) and a pseudo-random (PN) code used in a spread spectrum communication scheme. In general, a number of available frequencies and PN codes may provide a number of available channels within a subnet. Network masters and clients are capable of searching through the available channels to find a desirable channel over which to communicate with one another. Table 1 below illustrates an exemplary channel plan according to this scheme.

TABLE 1

| Available Frequency Bands | Available PN Codes | | | |
| --- | --- | --- | --- | --- |
|  | PN Code 1 | PN Code 2 | ... | PN Code n |
| Frequency Band 1 | Channel 11 | Channel 12 | ... | Channel 1n |
| Frequency Band 2 | Channel 21 | Channel 22 | ... | Channel 2n |

TABLE 1-continued

| Available Frequency Bands | Available PN Codes | | | |
|---|---|---|---|---|
| | PN Code 1 | PN Code 2 | ... | PN Code n |
| ... | ... | ... | ... | ... |
| Frequency Band N | Channel N1 | Channel N2 | ... | Channel Nn |

In one embodiment, a channel plan using two frequency bands is adopted and details of channel selection within such a scheme is discussed in greater detail below.

Network slot synchronization within a subnet 10 is addressed for four network operational situations: when a client wakes up; when a new client comes on-line; when the channel is changed; and when a client goes absent or shuts down. These situations are explained with reference to various finite state diagrams for the clients 16 and server 12. In the figures, the operational states of the network components are written within the circles. State transitions are made depending on the output of processing involved in the current state and/or the receipt and content of an incoming message. Any received or transmitted messages (i.e., commands) are shown next to the state transition lines. For example "A/B" on a state transition line means that the message "A" was received, to which message "B" was transmitted as an answer while transiting to the next state. In other cases, "A" may be the output of the ongoing process and "B" the action taken by the finite state machine. "XX" stands for a "don't care" action, input or output. A complete description of the various commands referenced in these figures is provided in the above-cited co-pending application.

Figure 3:
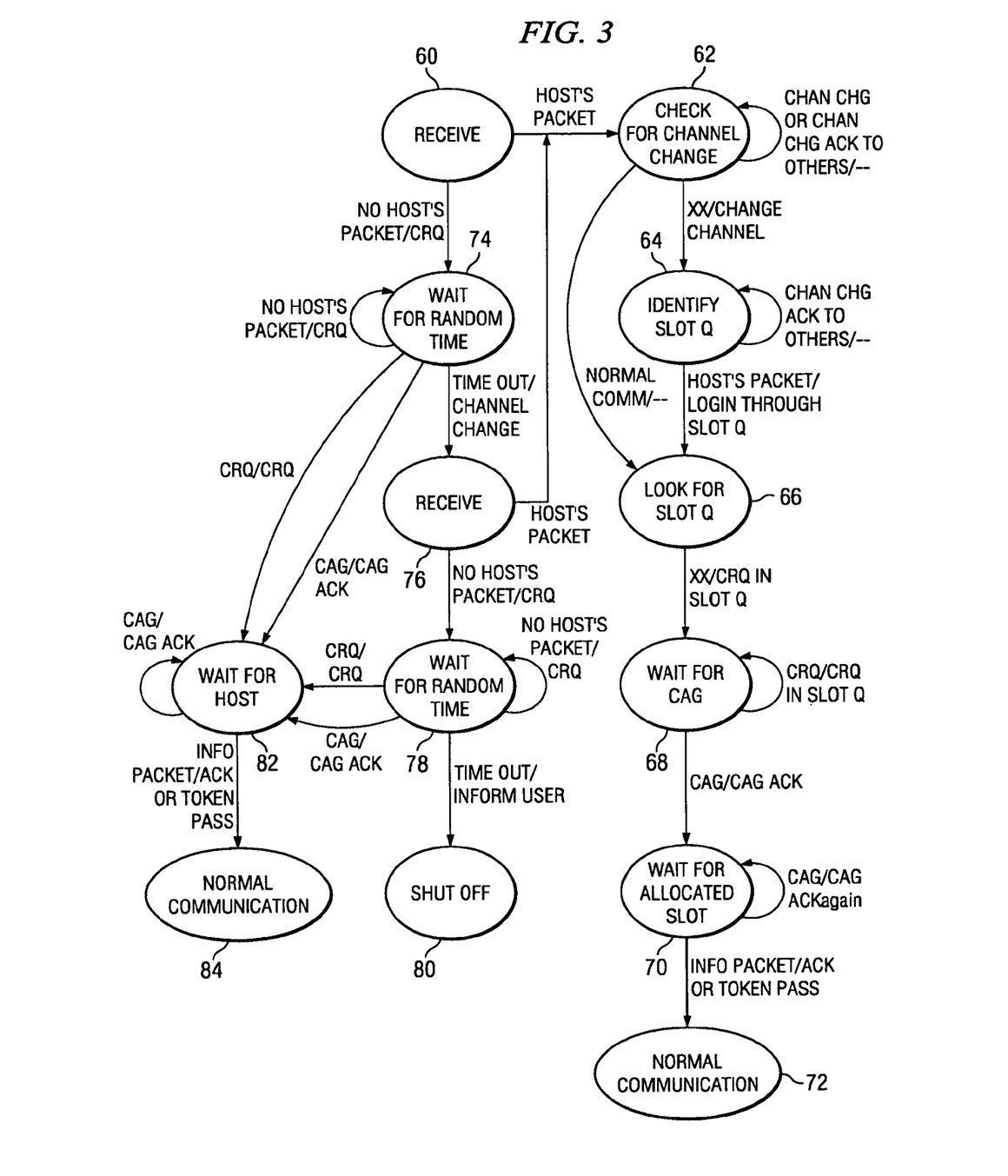
FIG. 3 is a state diagram illustrating a process for adding a client to a subnet in accordance with one embodiment of the present invention.

As shown in FIG. 3, when a client 16 wakes up, it starts out in a receive mode (state 60) and listens to a channel. If the client 16 detects activity on the channel, it listens to determine whether the server 12 is in the process of changing channels (state 62) (discussed further below). If a channel change process is recognized, the client 16 changes channels (state 64) along with the rest of the subnet 10. Of course, if no channel change is in process, the client 16 will detect only normal channel communications. Whether or not the client 16 was required to change channels, the client 16 waits for slot Q (state 66) and sends a Connection Request (CRQ) packet in that slot to the server 12. The format of a CRQ packet as well as other communication packets discussed herein may be found in the above-cited co-pending application. The specific structure of these packets, however, is not critical to the present scheme for network synchronization.

In response to the CRQ packet, server 12 checks the consistency of the incoming request (e.g., by sending the same request addressed to transmitting client periodically, perhaps once every network frame, until a response is received). Once a client's request is confirmed (e.g., by receipt of a confirmation packet from the client, after which the client enters a wait state 68), the server 12 sends a Connection Agreements (CAG) package to the client 16.

This package includes, among other things, information regarding the forward and backward bandwidth (e.g., the slots of the channel) to which the new client 16 is entitled. In addition, the maximum number of bytes the new client 16 can send/expect in each data packet is set for each type of packet (e.g., video data, audio data, etc.). The Connection Agreements package may also contain information regarding the total number of data frames that the new client 16 needs to wait (i.e., before transmitting its traffic) from the start of server's transmission and the identification of the preceding client (i.e., the client that owns the preceding reverse transmission slot).

All clients honor their respective connection agreements by counting the number of data frames they receive from the start of the server's transmission and start their respective transmissions after the end of last data frame received from the preceding client. While counting, if a client comes across an indication of the end of a transmission through a command transmitted by the preceding client (e.g., a token), then that client stops counting and immediately starts its own transmission. Thus, the use of a command is one mechanism by which network slot synchronization is assured in the present scheme.

After receiving the Connection Agreements packet, the client 16 configures itself to transmit its data in its assigned time slot (e.g., $B_1$, $B_2$, etc.) and waits for that slot to come around (state 70). At the designated time slot, the client 16 may initiate normal communications with the server 12 (state 72) and transmit any data or commands it may have. In order to help maintain proper time slot synchronization, part of this configuration process may involve programming an accurate slot timer (AST).

Figure 4:
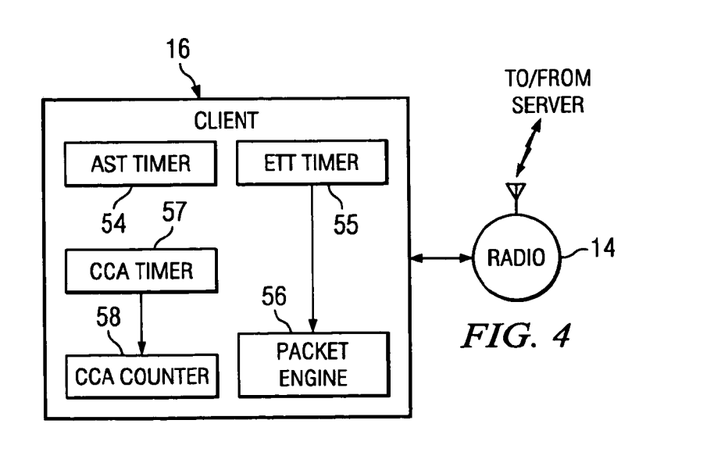
FIG. 4 illustrates a network client device configured with a collection of timers and counters used in maintaining network synchronization according to one embodiment of the present invention.

FIG. 4 illustrates a client 16 configured with an AST 54 in accordance with an embodiment of the present invention. The AST 54 may be a conventional timer (e.g., a register or memory location, which is incremented or decremented on a regular basis according to an appropriate clock signal maintained by the client device) that is programmed using information provided by the network master as part of the connection process. For example, the network master (e.g., server 12) may provide the newly connecting client with an indication of where it lies in within the slotted link structure of the communication protocol (i.e., at what time it should begin its transmissions). By then monitoring this time using AST 54 (which may be reset upon each master transmission or each transmission of the associated client), the newly connected client 16 can accurately predict when it should begin its transmission.

Of course, this synchronization scheme is preferably used in conjunctions with other techniques such as the token pass operations, early packet construction and clear channel assessments discussed herein so as to not improperly trigger or unnecessarily delay a client's transmissions. Further, the expiration of an AST-monitored time should not allow transmission in the event a client detects that a preceding client has not yet completed its own transmissions. Otherwise, the transmissions may overlap and cause confusion within the network.

In conjunction with the use of an AST 54 and the other synchronization schemes discussed below, a client 16 may also incorporate an early trigger timer (ETT) 55 to ensure that packets are ready for transmission within the subnet when the client's transmission slot arrives. That is, an ETT 55 may be used to advance the internal construction of a packet or packets for transmission, with the goal being to have those packets assembled and ready for transmission when the client's transmission slot becomes available. Thus the ETT 55 (which may be implemented as a conventional timer) triggers the process of formation of packets and their error protection bits, etc., using a packet construction engine 56 (which in some cases may be a part of client 16 or in other cases may be a part of radio 14) to keep a few packets, at least, prepared before the actual start of transmission. For example, in one embodiment packets could be assembled and stored for transmission one network frame in advance of their actual transmission. Such preassembly is helpful in avoiding the idle times on the channel when the first few packets for a transmission sequence are being formed. Although collecting data one network frame in advance of transmission may penalize the system with a one network frame latency at the first transmission slot, it is expected that this period can be reduced to a few milliseconds.

The above discussion assumed that the client 16 awoke to find a channel in use. However, it is possible that when the client 16 wakes up, the channel will not be busy. In such cases, the client 16 may transmit a Connection Request packet, hoping that the server 12 will respond, and wait for a random period of time (state 74). If no response is received, the client will change channels. While in receive mode in the new channel (state 76), if the client 16 detects activity, it proceeds to negotiate with the server 12 for bandwidth allocation as described above. Otherwise, if no channel activity is detected, the client 16 will again transmit a Connect Request packet and await a response (state 78). This process may repeat for all available channels until the server 12 is found. If no response is received, the client informs the user that no server is available and powers down (state 80). However, if a response is received from the server 12 in one of the channels, the client negotiates for connection (state 82) and then begins normal communications (state 84) as discussed above.

Figure 5:
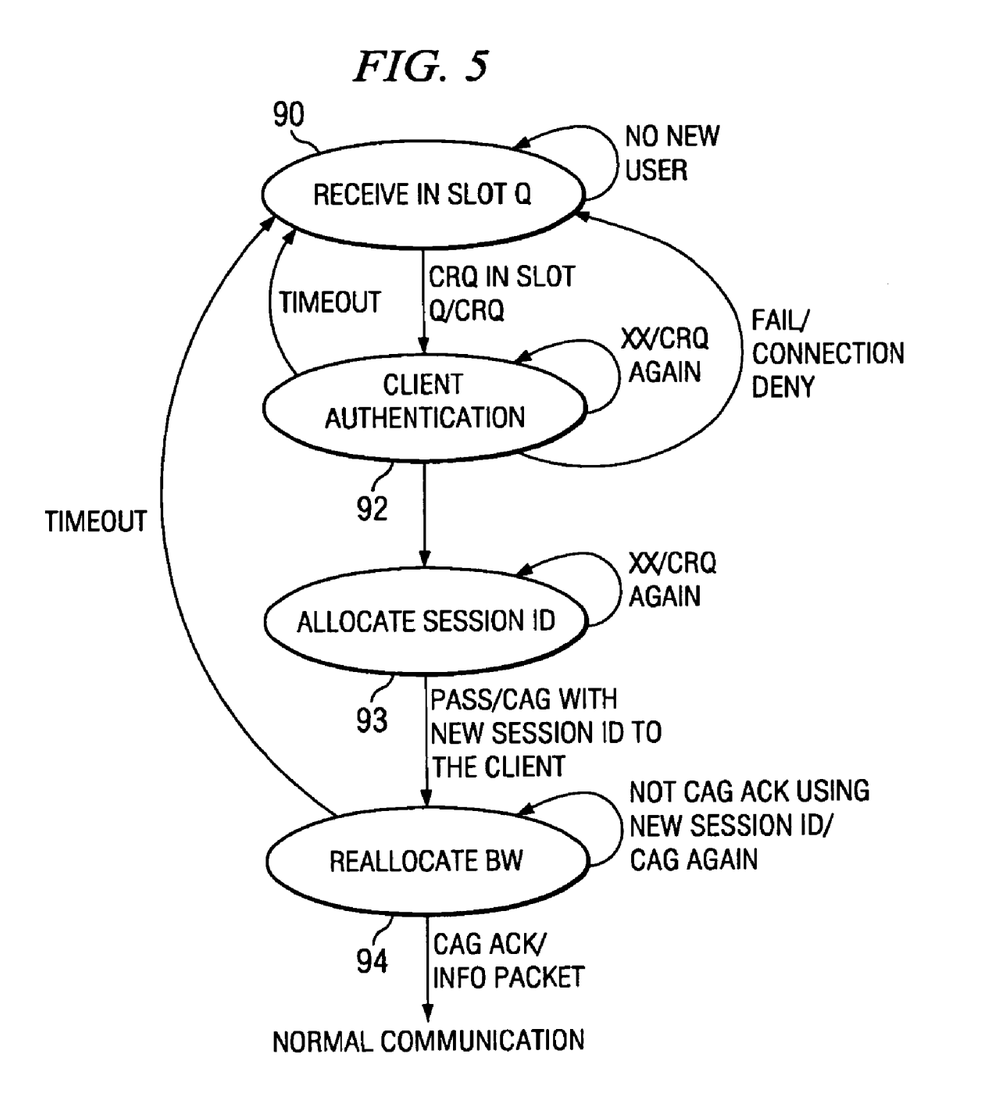
FIG. 5 is a state diagram illustrating a process for inserting a client into a subnet as seen by a server according to one embodiment of the present invention.

From the server standpoint, illustrated in FIG. 5, clients 16 may be inserted on-line. For example, a client 16 may wake up after the server 12 is already operating. The server 12 is configured to listen to slot Q (state 90) for any Connection Request packets transmitted by new clients seeking a connection. After synchronizing with the new client 16 through further exchanges of Connection Request packets, as discussed above, server 12 checks the client's authenticity (state 92) by requesting such authentication from the host computer 13 which stores a list of valid client IDs. If the authentication test passes, server 12 assigns a new client session identifier (CS-ID) to the client (state 93) and reallocates the bandwidth for the channel (state 94). The bandwidth reallocation is needed to accommodate the new client. Afterward, the server 12 transmits a Connection Agreement packet to the new client 16, thus initiating normal communications. As illustrated, each state 92, 93 and 94 may have an associated time-out parameter (e.g., maintained using an on-board timer). If at any time a client response is not received within a time-out period, the server 12 may assume that the client 16 has gone off-line and may revert to listening in the Q slot (state 90).

Figure 6:
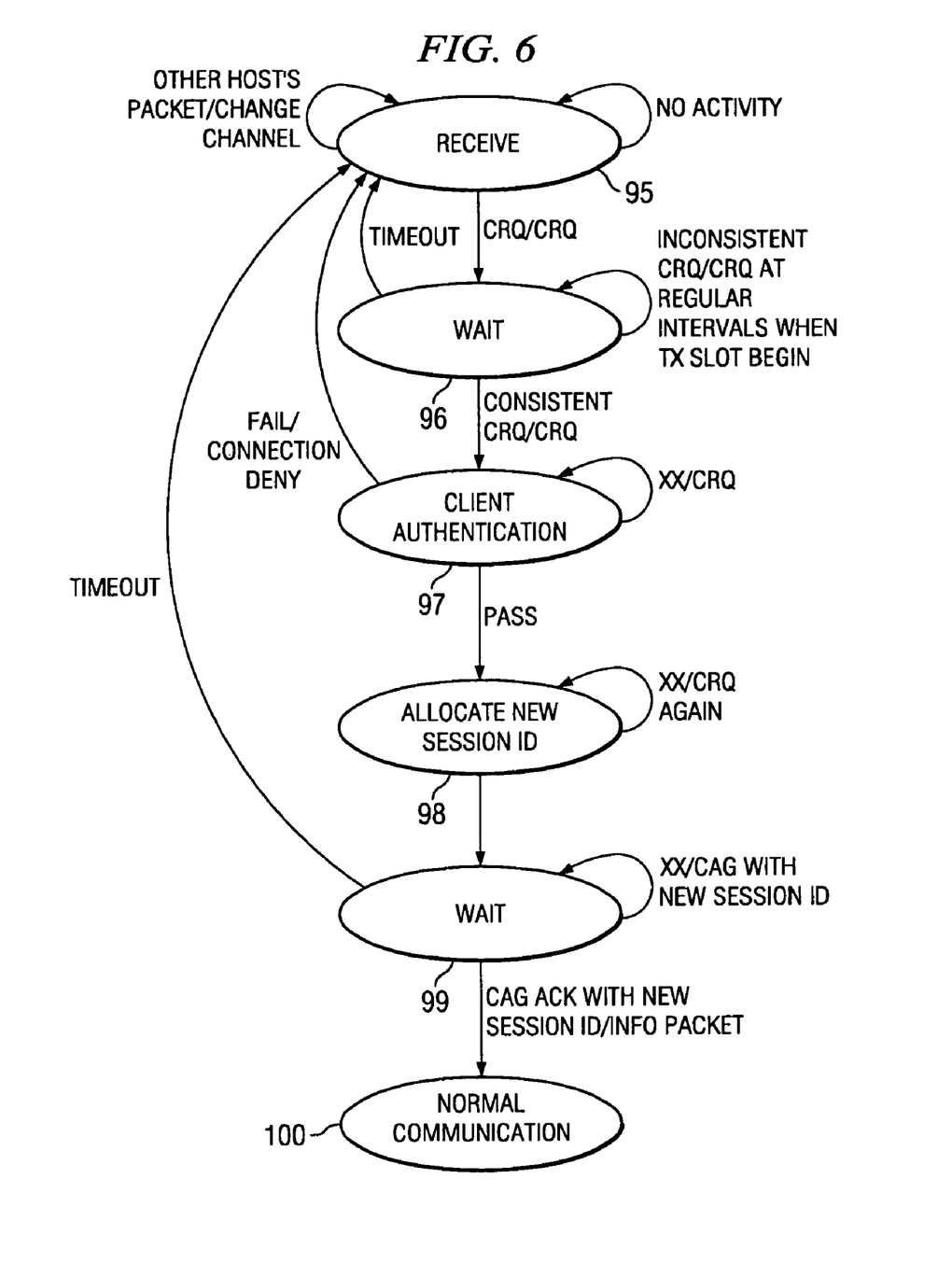
FIG. 6 is a state diagram illustrating a process for a server initiating a session for a new client in accordance with one embodiment of the present invention.

As shown in FIG. 6, when there are no on-line clients 16, the server 12 is configured to park in a free channel and remain in receive mode (state 95) until a client packet is detected. In order to determine whether a channel is free, the received signal strength (provided by radio 14) for each channel is checked and the one with the lowest energy is chosen. Next, any received data is analyzed for the presence of a valid data packet, other than a Connection Request packet. If any other packet is received, especially a packet that is marked as server generated, then the channel is declared busy. On the other hand, if the packets received on a channel do not contain any valid data other than Connection Request packets generated by clients awaiting connection, then the channel is declared free. If no data packets are received at all, the server 12 remains in receive mode (state 95) in that channel and waits for a client's Connection Request packet. In the interim, if the channel is occupied by another subnet in the current server's radio vicinity, that server switches to another channel and waits for a client's request. If all channels are occupied, then the server 12 keeps changing channels periodically until a free channel is found. Note that if a client 16 detect packets from two servers 12 consistently, then the client 16 recognizes that an interference situation is present on the channel and will not establish a connection across the wireless link. Similarly, if a server 12 detects packets from another server consistently, that server will not attempt to establish any client connections on the channel. These two measures ensure that a server from one subnet will not take possession of a client from a nearby subnet. Further, to avoid the capture of a client of one server by another server of a neighboring subnet, unique identifiers may be used for each subnet 10.

A client 16 may set the server 12 to action, for example by transmitting a Connection Request packet. The client 16 may then revert to a slave mode (e.g., with a time-out option). Once a client's request is received, the server 12 transmits the Connection Request packet periodically, and waits (state 96) for the client 16 to fall in line as described above. After confirming the client's slave mode through its transmissions, the server 12 tests the client's authenticity (state 97) and, if successful, offers a Connection Agreement to the client 16. If at any time during the authentication process the host computer 13 happens to take more time than the time that is required for the client 16 to respond, then the server 12 may delay the client 16 by re-sending the Connection Agreement packet without actually expecting any acknowledgment from the client 16. After transmitting a Connection Agreement, the server 12 allocates a new CS-ID (state 98) and then waits (state 99) for the client 16 to acknowledge the transmission. Normal communications may begin thereafter (state 100).

By first making the client a master and then turning it into a slave after the server 12 is awake, low interference on a free channel when the subnet 10 is not operating is ensured. Of course, in other embodiments server 12 may poll for clients 16 at regular intervals across the channel. However, such a scheme keeps the channel busy, even when the subnet 10 is not operating and, hence, may deny the channel to any neighboring subnets.

In some embodiments, multiple clients 16 (or shadow clients 18) are supported with the same input from the server 12. In such cases, only one copy of the forward data packets (with the client ID being that of the first client) need be transmitted. The remaining clients may be treated as shadow clients, with separate command packets from server 12 for each of them.

In multiple client scenarios, when one of the clients 16 wakes up late, it waits for the quiet (Q) slot and begins transmitting its command packets in that slot. However, it is possible that more than one client may wake up after the server 12, in which the present scheme provides a means to resolve potential collisions which may occur if two or more clients 16 each attempt to transmit in the Q slot. To avoid such collisions, clients 16 may randomly choose to (or not to) insert their respective requests in the Q slot. The client 16 that is first recognized by the server 12 will be first added to the subnet 10, and so on.

Table 2 below (in which Tx represents a radio 14 in a transmit state and Rx represents a radio 14 in a receive state) details a multiple client scenario and the generic state diagram for on-line insertion of a new client.

TABLE 2

| Slot Type | Server | Client 1 | Client 2 | Client 3 | ... | Client N | New Client |
|---|---|---|---|---|---|---|---|
| F | Tx | Rx | Rx | Rx | Rx | Rx | Rx |
| T | Tx-to-Rx | Rx-to-Tx | Rx | Rx | Rx | Rx | Rx |
| $B_1$ | Rx | Tx | Rx | Rx | Rx | Rx | Rx |
| T | Rx | Tx-to-Rx | Rx-to-Tx | Rx | Rx | Rx | Rx |
| $B_2$ | Rx | Rx | Tx | Rx | Rx | Rx | Rx |
| ... | ... | ... | ... | ... | ... | ... | ... |
| $B_N$ | Rx | Rx | Rx | Rx | Rx | Tx | Rx |
| T | Rx | Rx | Rx | Rx | Rx | Tx-to-Rx | Rx-to-Tx |
| Q | Rx | Rx | Rx | Rx | Rx | Rx | Tx |
| T | Rx-to-Tx | Rx | Rx | Rx | Rx | Rx | Tx-to-Rx |
| F | Tx | Rx | Rx | Rx | Rx | Rx | Rx |

Because of the designated time slot arrangement, if one client responds late for some reason, other clients cannot seize its designated time slot. This can cause a waste of precious bandwidth. Accordingly, the present scheme provides a two-fold solution for this problem.

First, each client 16 may be required to keep track of the present client occupying the channel, thereby trying to detect its immediately preceding client in line. If the channel is quiet, the current client waits for a predetermined length of time before starting its own transmission. In one embodiment, the length of this waiting time depends on the quiet time threshold allowed between two clients (termed the clear channel assessment or CCA time) and the number of clients yet to transmit before the current client. For example, the waiting time may be the product of the CCA threshold and the number of devices yet to transmit. This waiting time calculation thus makes use of the order of transmission that is established during the connection setup. The only exception to the quiet time is the Q slot, when all on-line clients 16 should refrain from transmitting.

As indicated, a CCA transmission (i.e., a client's transmission based on a waiting period timeout) is essentially the result of a decision made by the client that the channel is free and hence is suitable for transmission. Each client device keeps track of how many devices have completed the transmission from the time the network master completed its transmission. This can be done using a counter that is incremented each time a client transmission is detected and the implementation of such counters is well known in the art. Then, by knowing the index of its own position in the network frame (a value received from the network master at the time a connection is established), each client device can determine when to initiate a CCA transmission. This is best illustrated with an example.

Each client device may program an associated CCA timer 57 (see FIG. 4) to a predetermined value. The network master may specify this value at the time a master-client connection is established and it generally represents a period of time that must expire before a network client is permitted to assume that another client is not using the channel. Now, suppose a client device is $5^{th}$ in line for transmission after the master device and suppose it detects a clear channel (e.g., because its CCA timer 57 times out) after the device that is second in line has completed its transmission. Because the device is $5^{th}$ in line, it cannot immediately begin its own transmissions (after all, there are still two client devices in line ahead of it). However, the $5^{th}$ device may increment an associated CCA counter 58 at this time. If then both the $3^{rd}$ and $4^{th}$ devices are silent (i.e., if the $5^{th}$ device's CCA timer 57 times out two more times in succession), then the $5^{th}$ device will have again twice incremented its CCA counter 58 and may immediately start its own transmission on the $3^{rd}$ CCA detection.

Note that in the above example, the $3^{rd}$ device in line will also have detected the absence of the second device's transmission and may therefore immediately start its own transmission if indeed it has traffic to send. In other words, the $3^{rd}$ device's waiting period is only one CCA timeout from the absence of the $2^{nd}$ device's transmissions, while that of the $5^{th}$ device is three CCA timeout periods. Similarly, the $4^{th}$ device in line is two CCA timeout periods away from the second device. This use of the client slot assignments in determining when CCA transmissions may be initiated allows the client devices to maintain their relative sequence with one another within the slotted link structure of the communication channel.

The second part of the solution for ensuring a client's transmission slot will not be captured if it responds late for some reason is as follows: Server 12 observes any channel takeovers and takes appropriate action to connect/disconnect any consistently delayed client(s). When such a delay in response occurs, a video generating client/server accordingly reduces the size of output data in the next video slot. This allows proper slot time synchronization to be maintained. The video generating client/server keeps track of the idle channel length and reduces its output appropriately in the current/next video slot.

To accommodate a new client, the size of slot Q should be at least as long as one radio data frame 40 carrying a Connection Request packet. Thus, the new client 16 may receive all the data frames, learn the data frame structure in the current session and then insert its request for connection in the slot Q between the transmissions of the last on-line client and the server 12. The request may be confirmed after checking for its consistency over several transactions (i.e., between server transmissions). Note that the radio turn around time needs to be kept in mind and should not be confused with the Q slot. This may be verified using a timer.

In order to inform a new client that the server 12 recognized its connection request, the server 12 needs to send a packet to the new client. Thus, the server 12 needs to ensure that the first client which is supposed to start its transmission following the server (i.e., the client which has been allocated slot $B_1$), should not overlap with the last packet sent by the server 12 for the new client at the end of the F slot. Hence, the server may broadcast a Token Pass at the end of its transmission. The first client in line would then commence its transmission after receiving the Token Pass from the server 12 (and after allowing for a radio turn around time if required) or timing out on an idle channel.

As discussed above, when the channel is changed, all clients 16 need to resynchronize to the server 12. Channel switching may occur when either the server 12 or one of the clients 16 experiences serious channel impairments (e.g., despite antenna diversity and/or a higher degree of ECC). In such scenarios, the server 12 searches for another channel, in an attempt to find a channel where the interference is less severe. If it determines that the new channel offers better prospects for communication operations, server 12 initiates a channel change or switch operation.

Figure 7:
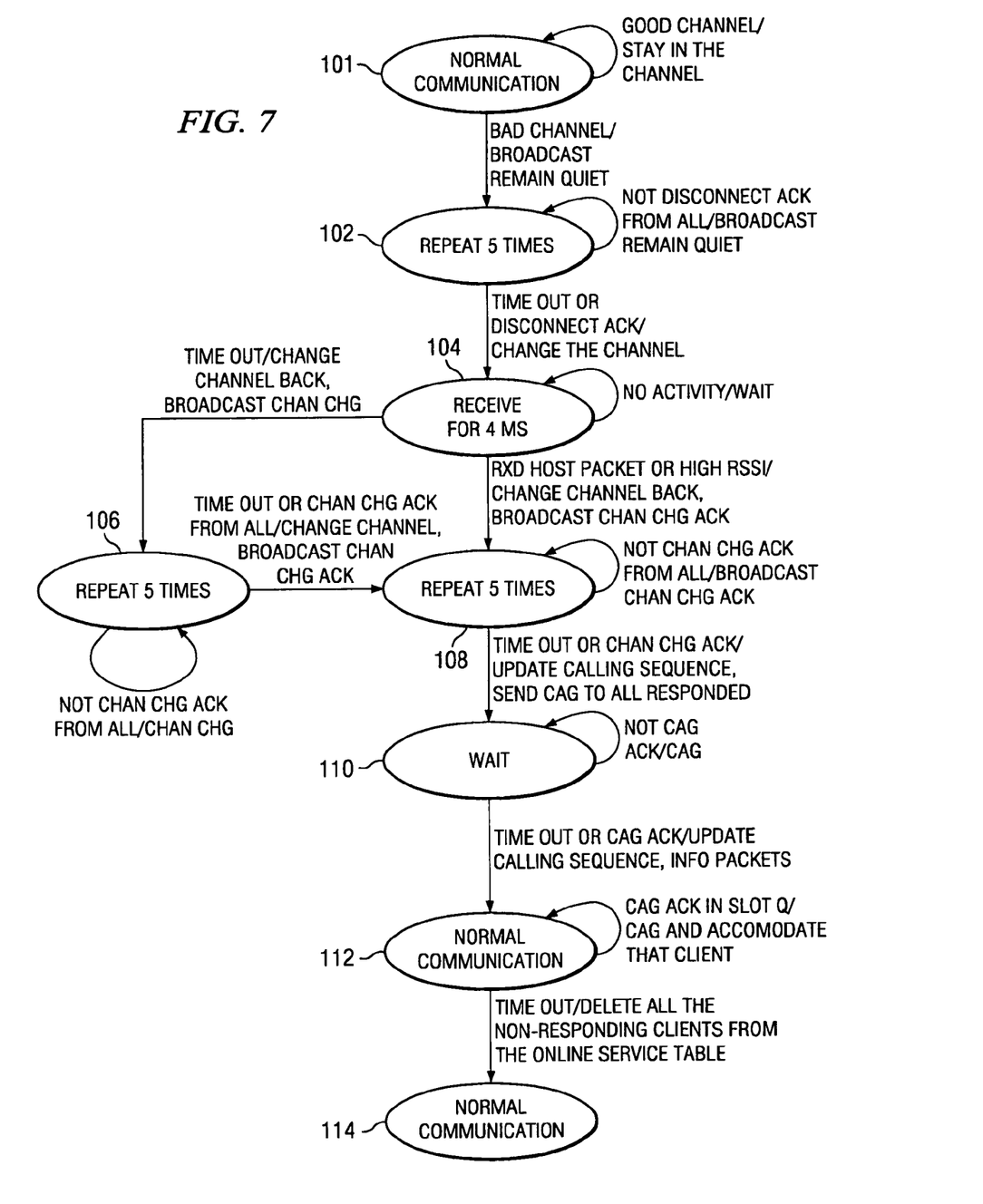
FIG. 7 is a state diagram illustrating a process for changing channels in a subnet as seen by a server in accordance with one embodiment of the present invention.

FIG. 7 illustrates the channel changing sequence for a two-channel subnet, as seen by the server 12. If during normal communications (state 101), server 12 determines that channel conditions are or are becoming unacceptable, before beginning the search for a new channel the server 12 informs all of its clients 16 to remain quiet for a time. This procedure is repeated a number of times (state 102) (e.g., five times), to ensure the message is received by all clients 16. In response, the clients are expected to transmit an acknowledgment, however, even if acknowledgments are not received from all of the on-line clients 16, a timer at server 12 may time-out, allowing server 12 to tune its radio 14 so as to inspect the other channel (state 104). If the new channel is free, the server 12 switches back to the original channel (e.g., after a predetermined listening period, say 4 msec. for one embodiment), broadcasts a Change Channel message (possibly repeatedly, say up to 5 times) to all the on-line clients 16 and waits for the receipt of individual Change Channel Acknowledge (Ack.) messages for the clients 16 (State 106). Each client 16 changes channels only after it sends its Change Channel Ack. message. If, after waiting a predetermined length of time, server 12 still has not received a response from one or more of the on-line clients 16, the server 12 decides that the client(s) is/are unreachable. Similarly, a client 16 may decides that the server 12 is unreachable if, after waiting for a predetermined amount of time, it receives no messages from the server, and may voluntarily change channels. The server 12 switches to the new channel after all the on-line clients 16 respond or after a time-out condition.

Once in the new channel, the clients 16 wait for the server 12 to start communication. The server 12 broadcasts a Change Channel Ack. message (state 108) to announce its presence in the new channel and expects a Change Channel Ack. from each client 16. If one or more clients 16 do not respond within a predetermined number of attempts, the server 12 decides that the client(s) 16 is/are temporarily absent. Accordingly, the server 12 changes the response sequence of the clients 16 (e.g., by transmitting new Connection Agreements) so as to keep out the clients that are absent. After waiting (state 110) for all the clients 16 to confirm their presence in the new channel (or for a time-out period to expire), the server 12 updates the call-respond slot sequence for the new channel and sends new connection agreements to all the clients 16. Normal communication may resume thereafter (state 112).

If a client 16 reaches the new channel late, it needs to wait for the server's call to respond. If the server 12 has already decided the client 16 is absent, the client 16 waits till the resumption of normal communications and then sends a Change Channel Ack. message in the quiet (Q) slot. When the sever 12 receives such a message, it sends a connection agreement and includes the latecomer in the network.

In order to leave any user associated with the late client unaffected during this time, two measures are employed. First, all the clients 16 are configured to provide video frame freeze and/or audio repetition, so as to simulate a smooth session at the user level. Second, the server 12 maintains the session details for a predetermined period, long enough so as to allow for easy reconnection. Only after the expiration of the predetermined waiting period is an absent client 16 finally deleted from the server's on-line client list (state 114).

If the server 12 receives a Change Channel Ack. message from a very late client 16 after its deletion from the on-line list, then the client 16 is advised to connect anew by sending a Connection Request. In such cases, the client 16 may inform the user that the link was lost. This may appear similar to power glitch at the user level and would prompt the user to re-establish a link with the server 12.

During channel selection (e.g., initially or as part of a channel change operation), the server 12 needs to detect an already operating subnet 10 over the current channel and the potential existence of a link with the same PN code and/or link ID. The probability of such an occurrence is expected to be very low, but it is non-zero. The link ID is assumed to be unique to the link/subnet/cell. To ensure such uniqueness, a user may be prompted to enter a unique password (e.g., a social security number or other unique alphanumeric string of similar length) during the subnet installation. This password may be parsed by the server 12 (and/or its host computer 13) and used to establish a unique link ID and PN code. These values may remain the same for all sessions, unless the user decides to alter them (e.g., by reinstalling the subnet 10).

In one embodiment, 11-bit PN codes (Barker codes) may be used, although higher bit lengths may also be used to ensure uniqueness and thus provide additional security. A table of available PN codes is maintained by the server 14/host computer 13, and one of the codes is chosen based on the password entered by the user. The PN code may be altered whenever there is increased interference due to use of the same PN code in a neighboring subnet 10.

If both the channels are occupied or have large interference, then the server 12 can take one of two actions. If there are fewer clients 16 to/from which the channel interference is severe, then the server 12 may decide to disconnect them. On the other hand, if the number of clients 16 involved is large, then the server 12 may decide to wait for a while and try the channel some time later. In either case, server 12 needs to transmit a Retry Later command to each of the clients 16 involved, until a Disconnect Ack. message is received from each of the affected clients 16.

Figure 8:
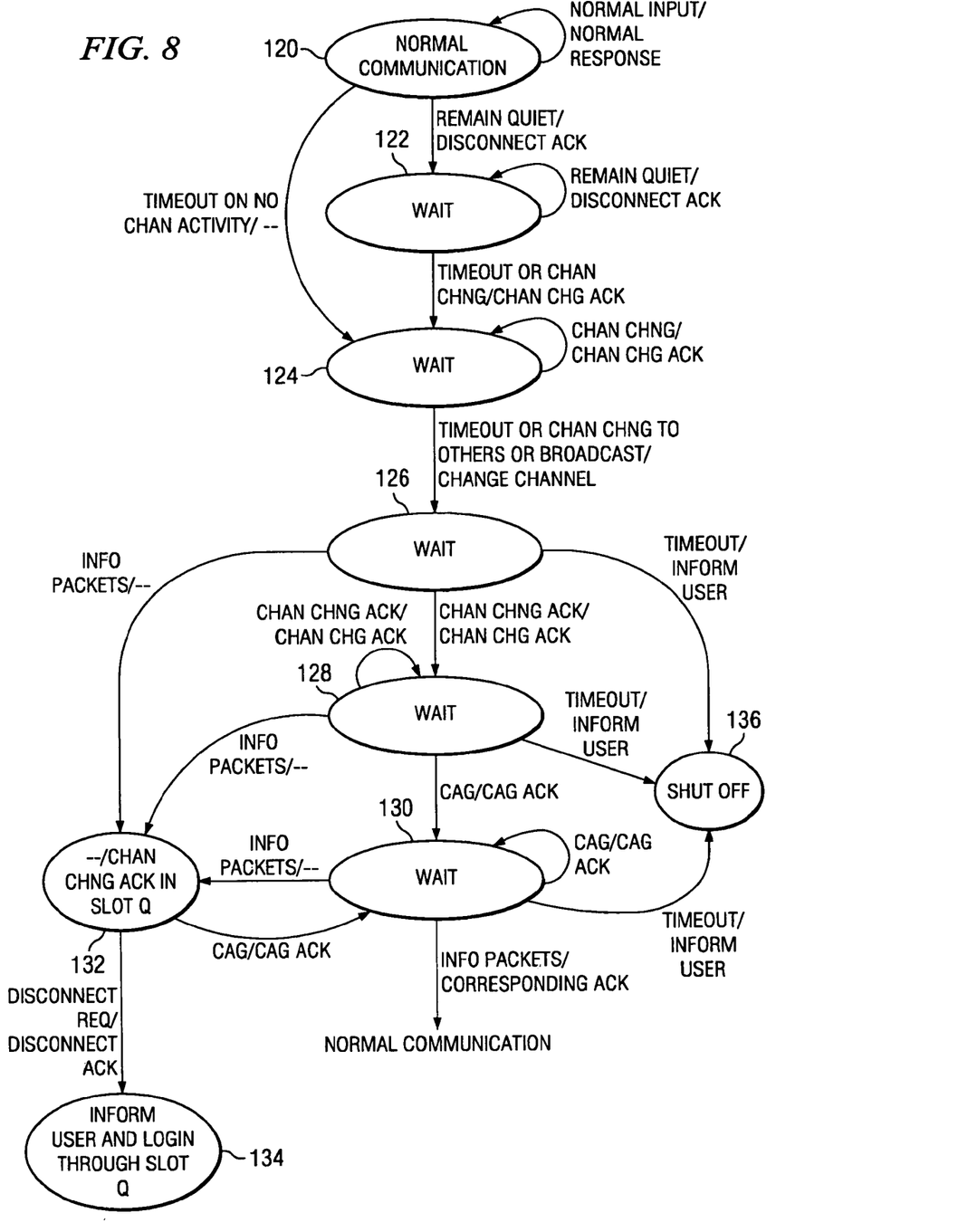
FIG. 8 is a state diagram illustrating a process for the channel changing sequence for a subnet as seen by a client in accordance with one embodiment of the present invention.

FIG. 8 now illustrates a channel switching operation from the client-side for the exemplary two-channel subnet. If during normal communications (state 120), a client 16 is instructed to remain quiet, the client 16 transmits an acknowledgment (e.g., a Disconnect Ack.) and then waits (state 122) for further instructions from server 12. If server 12 broadcasts a Change Channel message, clients 16 acknowledges and then changes channels. Alternatively, a client 16 may decide that the server 12 is unreachable if, after waiting for a predetermined amount of time, it receives no messages from the server, and may voluntarily change channels.

Once in the new channel, the client 16 waits for the server 12 to start communication (state 126). The server 12 broadcasts a Change Channel Ack. message to announce its presence in the new channel and expects a Change Channel Ack. from each client 16. Accordingly, client 16 confirms its presence in the new channel and waits for a new connection agreement from the server 12 (state 128). Upon renegotiating its connection agreement with the server 12, the client 16 waits for normal communications to resume (state 130).

If the client 16 reaches the new channel late, it needs to wait for the server's call to respond. If the server 12 has already decided the client 16 is absent, the client 16 waits until the resumption of normal communications and then sends a Change Channel Ack. message in the quiet (Q) slot (state 132). When the sever 12 receives such a message, it sends a connection agreement and includes the latecomer in the network. In order to leave any user associated with the late client unaffected during this time, the client 16 may provide video frame freeze and/or audio repetition, so as to simulate a smooth session at the user level.

If the server 12 receives a Change Channel Ack. message from a very late client 16 after its deletion from the on-line list, then the client 16 is advised to connect anew by sending a Connection Request. In such cases, the client 16 may inform the user that the link was lost (state 134). This may appear similar to power glitch at the user level and would prompt the user to re-establish a link with the server 12. During channel selection, if the client 16 loses contact with the server 12 for a prolonged period, it may inform the user of the situation and turn off (state 136).

Figure 9:
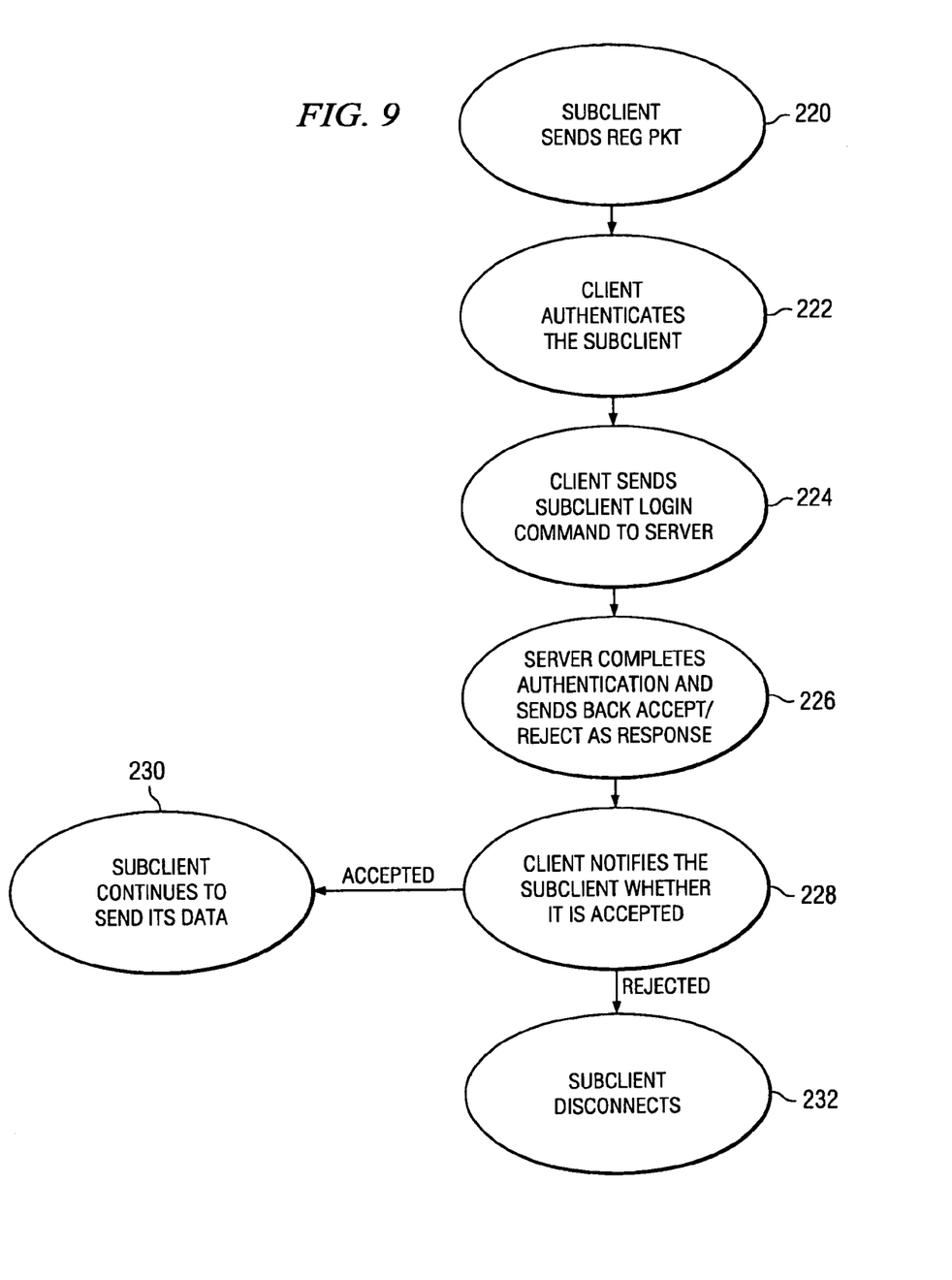
FIG. 9 is a state diagram illustrating a process for online insertion of a subclient into a subnet in accordance with one embodiment of the present invention.

Like clients 16, subclients 20 may also be inserted online into an operating subnet (i.e., also referred to as hot insertion). As shown in FIG. 9, when a subclient 20 wakes up, it sends a registration packet to its associated client (state 220) via a communication link 21. In some cases, communication link 21 may be a wireless link (e.g., an infrared communication link) while in other cases it may be a wired link.

Upon receiving the transmission from the subclient 20, the client 16 authenticates the subclient (state 222), for example by checking its registration identification information against a list of known/authorized subclients. In some cases, this may require communication with the server 12. If the subclient 20 is recognized, the client 16 constructs a subclient session identifier that will uniquely identify the new subclient from any other subclients operating online with the client. Then, the client 16 transmits an Add Subclient command (see further below) to server 12 state 224). The Add Subclient command includes the subclient session identifier and the characteristics of the subclient as discussed in greater detail below.

Server 12, upon receipt of the Add Subclient command, completes the subclient authentication process (state 226) by recording the subclient session ID and determining whether the subnet can accommodate the addition of the new subclient (e.g., whether sufficient bandwidth on the wireless link is available to accommodate commands sent to/from the new subclient). If the authentication process is successful, the server adds the new subclient to the subnet by inserting it into an online service table and sending the associated client a Subclient Added command. If the new subclient cannot be accommodated or is otherwise rejected, the server sends a Subclient Not Added command.

Whatever the server's decision, the result of the authentication process is transmitted from the client to the subclient (state 228). If the subclient was accepted, it begins normal operation and communicates with its client and server 12 (state 230). If the subclient was rejected, it disconnects (state 232). In either case, a user may be notified of the addition or rejection of the subclient through an appropriate status message displayed on a display device.

During network operations, a subclient 20 may be disconnected by either the server 12 or the associated client 16. For example, if the subclient 20 is inactive for more than a predetermined length of time, the client 16 may disconnect the subclient 20. In such a case, the client 16 should advise the server 12 of the situation and request that the disconnected subclient be removed from the server's list of online devices (see the discussion of the Delete Subclient and Subclient Deleted commands below).

In other cases, server 12 may decide to delete a subclient 20 directly, for example if an application running on the host 13 does not support a particular subclient (or client for that matter). Also, network maintenance and shutdown operations may require that subclients (and clients) be deleted automatically.

Thus, a scheme for synchronizing communications within a computer network communication channel has been described. Although discussed with reference to certain illustrated embodiments, the present invention should not be limited thereby. Instead, the present invention should only be measured in terms of the claims that follow.

What is claimed is:

1. A method for efficiently utilizing bandwidth in a wireless network including a server and one client and another client, wherein data transmission across a data communications channel in the network is organized into frames including a plurality of time slots, wherein one time slot is assigned to the one client and another time slot is assigned to the another client, and wherein the one time slot precedes the another time slot within a frame, the method comprising:
    at the another client, monitoring the one time slot to determine whether the one client is transmitting data to the server in the one time slot of a current frame;
    waiting at the another client for a predetermined time interval that is a product of a clear channel assessment time and the number of time slots between the one time slot and the another time slot; and
    after the predetermined time interval, transmitting data from the another client to the server during the one time slot in the current frame responsive to a determination that the one client is not transmitting during the one slot in the current frame.

2. The method of claim 1, wherein the one time slot is a fixed time slot.

3. The method of claim 1, further comprising pre-assembling at least one data packet in advance at the another client such that the at least one data packet is available for transmission during the one time slot.

4. The method of claim 3, further comprising triggering pre-assembly of the at least one data packet in response to an early transmission timer maintained by the another client.

5. The method of claim 1, further comprising specifying the clear channel assessment time with the server.

6. The method of claim 5, wherein the clear channel assessment time is specified by the server at connection time of the another client.

7. The method of claim 1, wherein the frames of a plurality of time slots are transmitted on a transmission channel and the method further comprises selecting the channel from a plurality of channels with the server.

8. The method of claim 7, wherein the channel comprises a spread spectrum channel defined by a frequency band and a pseudo-random code.

9. The method of claim 7, further comprising searching for an available channel with the server for selection as the transmission channel.

10. The method of claim 1, wherein the clear channel assessment time is specified by the server in a connection agreement with the another client.

11. The method of claim 1, wherein the server assigns the one time slot in a connection agreement with the one client.

* * * * *